United States Patent
Kopczynski

[11] 3,863,792
[45] Feb. 4, 1975

[54] MACHINE TOOL
[76] Inventor: John F. Kopczynski, 1671 Sweeney, North Tonawanda, N.Y. 14120
[22] Filed: May 2, 1973
[21] Appl. No.: 356,616

[52] U.S. Cl. ............................................... 214/340
[51] Int. Cl. .............................................. B65g 7/00
[58] Field of Search .................... 214/338, 339, 340

[56] References Cited
UNITED STATES PATENTS
| | | | |
|---|---|---|---|
| 3,145,861 | 8/1964 | Gargrave | 214/340 |
| 3,695,468 | 10/1972 | Stevens et al. | 214/340 |

*Primary Examiner*—Robert G. Sheridan
*Attorney, Agent, or Firm*—Joseph P. Gastel

[57] ABSTRACT

A machine tool for rotatably mounting a workpiece having spaced cylindrical portions comprising a base, first, second and third shafts mounted in spaced substantially parallel relationship on said base, each of said first, second and third shafts mounting axially spaced rollers for engaging a workpiece at circumferentially spaced locations, and a pivot axis extending radially to the rollers on one of said shafts to permit said rollers to pivot toward and away from the workpiece whereby both of the rollers on said one of said shafts will maintain rolling engagement with said workpiece notwithstanding differences in diameter thereof. The rollers on the various shafts are axially spaced in such a manner so as to engage spaced narrow circumferential portions of the workpiece on opposite sides of a depression or raised portion on the workpiece to thereby be capable of rotating said workpiece in a stable manner.

10 Claims, 25 Drawing Figures

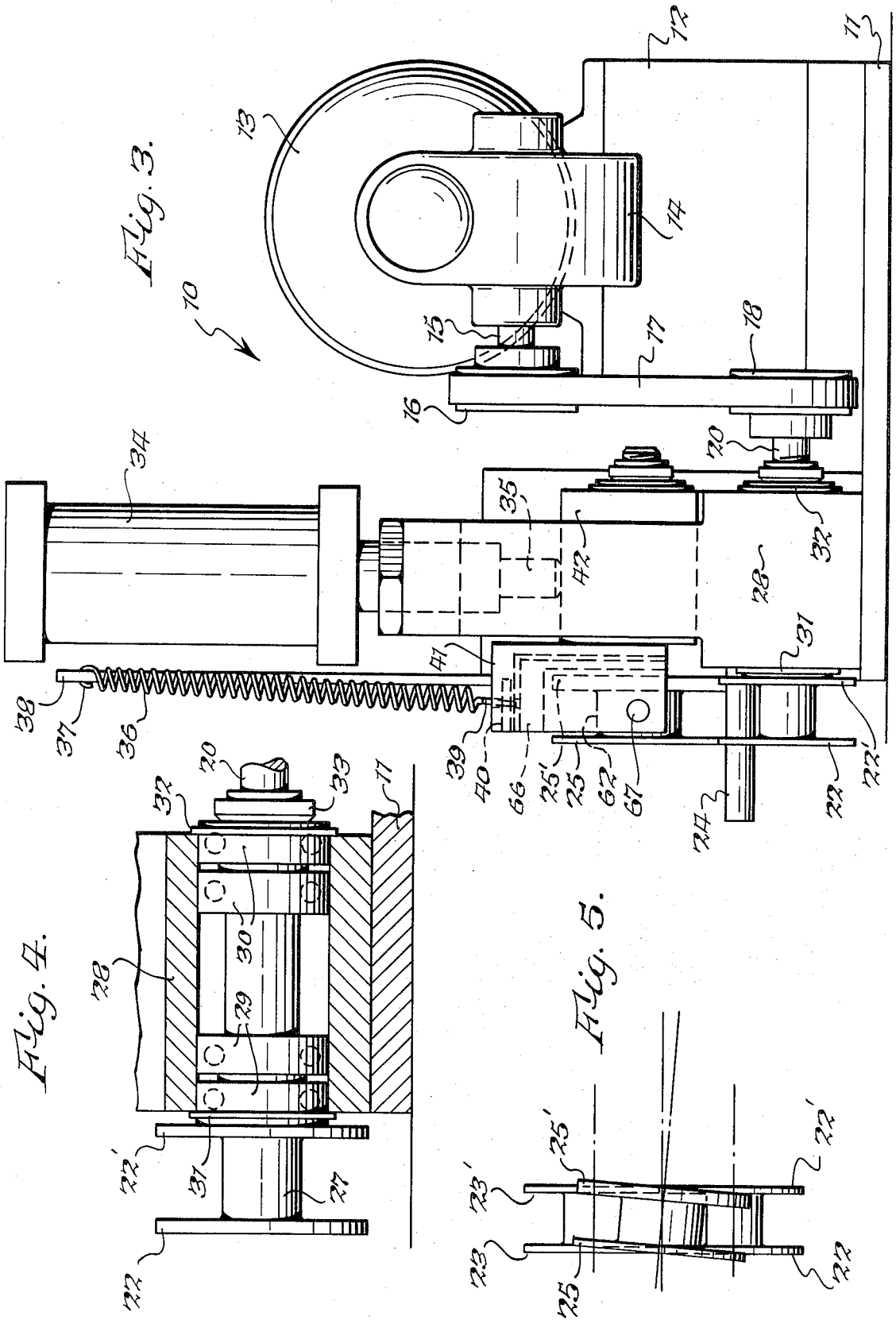

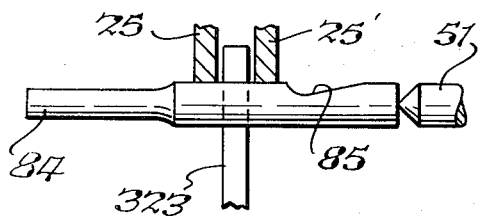
Fig. 18.
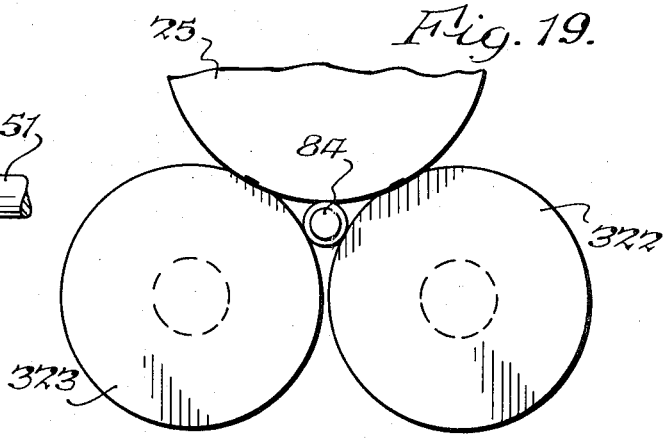
Fig. 19.
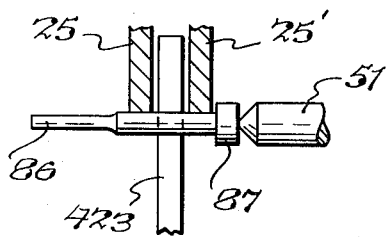
Fig. 20.
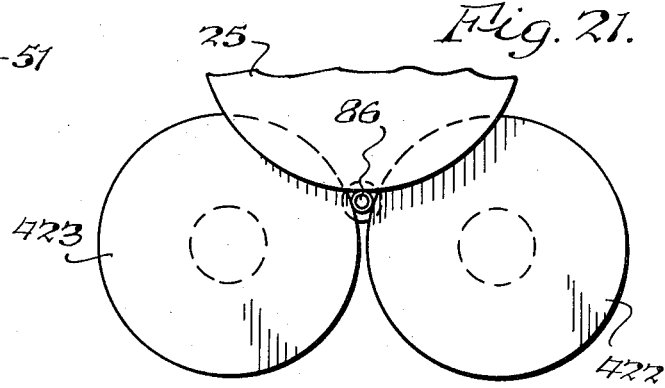
Fig. 21.
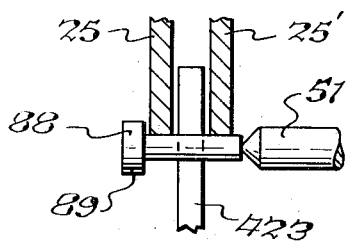
Fig. 22.
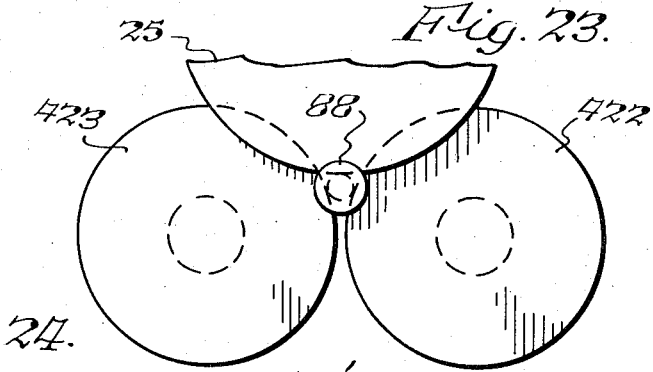
Fig. 23.
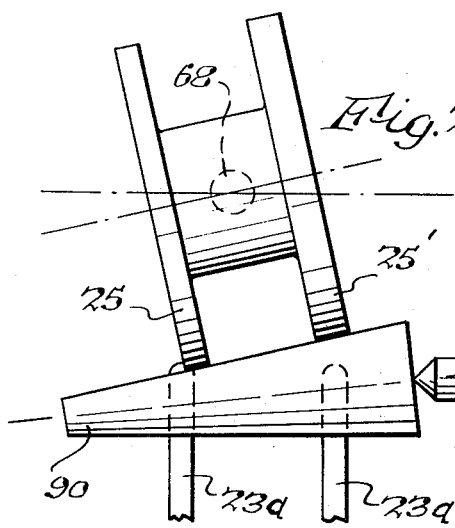
Fig. 24.
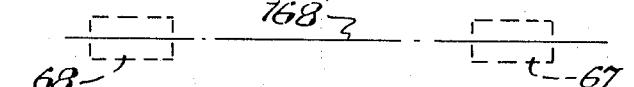
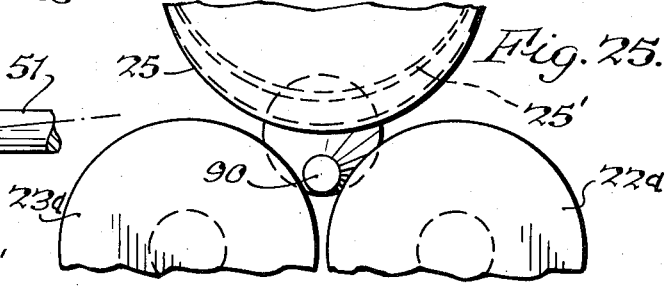
Fig. 25.

MACHINE TOOL

The present invention relates to machine tools and more particularly to those which are used to center, hold and rotate a workpiece which is to be operated on by a tool.

By way of background there are machine tools in existence which are used to rotate a workpiece, such machines being exemplified by my previous U.S. Pat. Nos. 2,709,322, 2,727,342 and 2,741,074. In such machines the workpiece is engaged and rotated by shaft-mounted rollers which are spaced circumferentially about the workpiece. However, there are workpieces, such as certain types of punches, which have narrow circumferential bands straddling a non-cylindrical portion. Such workpieces cannot be rotated by single narrow rollers on a narrow circumferential portion because the workpiece will not rotate in a stable manner. Therefore, rollers which are axially spaced on a shaft are used to engage axially spaced portions of the workpiece. However, when the workpiece is engaged by such axially spaced rollers, if there is a slight difference in diameter of the parts of the workpiece engaged by the spaced rollers, the roller on the portion of smaller diameter loses contact with the workpiece, thereby decreasing the stability with which the workpiece is rotated. It is with overcoming the foregoing deficiency of the prior art that the present invention is concerned.

It is accordingly the primary object of the present invention to provide an improved machine tool having rollers axially spaced on a shaft for rotating a workpiece, with the rollers being mounted in such a manner so as to automatically maintain contact with axially spaced portions of the workpiece notwithstanding differences in diameter of such portions.

Another object of the present invention is to provide an improved machine tool for rotating, with a high degree of stability, a cylindrical workpiece having a depressed or raised portion thereon. Other objects and attendant advantages of the present invention will readily be perceived hereafter.

The improved machine tool for rotating a workpiece comprises a base, first and second shafts mounted in spaced substantially parallel relationship on said base, first and second roller means mounted on said first and second shafts, respectively, for rotatably engaging said workpiece, a third shaft mounted on said base in generally parallel relationship to said first and second shafts, axially spaced third and fourth roller means mounted on said third shaft for rotatably engaging said workpiece at axially spaced locations thereon, said first, second, third and fourth roller means being oriented relative to each other to receive said cylindrical workpiece therebetween, and pivot means providing a pivot axis extending generally radially relative to said third and fourth roller means for permitting said third and fourth roller means to pivot in a direction toward and away from said workpiece, whereby said third and fourth roller means will maintain full engagement with said workpiece irrespective of slight differences in diameter thereof. The first roller means and the second roller means each include spaced rollers, which are spaced in the same manner as the third and fourth roller means so as to be capable of engaging axially spaced cylindrical portions straddling a depressed or raised portion of the workpiece whereby the improved machine tool of the present invention is capable of rotating the workpiece with a high degree of stability because it engages the spaced cylindrical portions thereof.

The various aspects of the present invention will be more fully understood when the following portions of the specification are read in conjunction with the accompanying drawings wherein:

FIG. 3 is a side elevational view of the machine tool of FIG. 1;

FIG. 4 is a fragmentary cross sectional view taken substantially along line 4—4 of FIG. 2 and showing the manner in which the shaft which mounts the rollers is journalled on the base of the machine;

FIG. 5 is a schematic plan view showing the manner in which the various rollers are oriented relative to each other to bias a workpiece engaged therebetween in a predetermined axial direction;

FIG. 18 is a fragmentary cross sectional view taken substantially along a vertical centerline of FIG. 19 and showing a workpiece supported by rollers which are in intermeshing relationship with each other with the workpiece having a depression which extends out beyond the rollers;

FIG. 19 is a view taken from the left of FIG. 18;

FIG. 20 is a fragmentary cross sectional view taken substantially along a vertical centerline of FIG. 21 and showing a workpiece supported by intermeshing rollers with the workpiece having a protuberance thereon which extends beyond the rollers;

FIG. 21 is a fragmentary view taken from the left of FIG. 20;

FIG. 22 is a view similar to FIG. 20 but showing the workpiece having a protuberance thereon with the protuberance being located on the opposite side of the rollers than the workpiece shown in FIG. 20;

FIG. 23 is a view taken from the left of FIG. 22;

FIG. 24 is a view taken along a vertical centerline of FIG. 25 and showing the manner in which the pivotable rollers automatically adapt themselves to support a frustoconical workpiece; and FIG. 25 is a fragmentary view taken from the left of FIG. 24.

Figure 1:
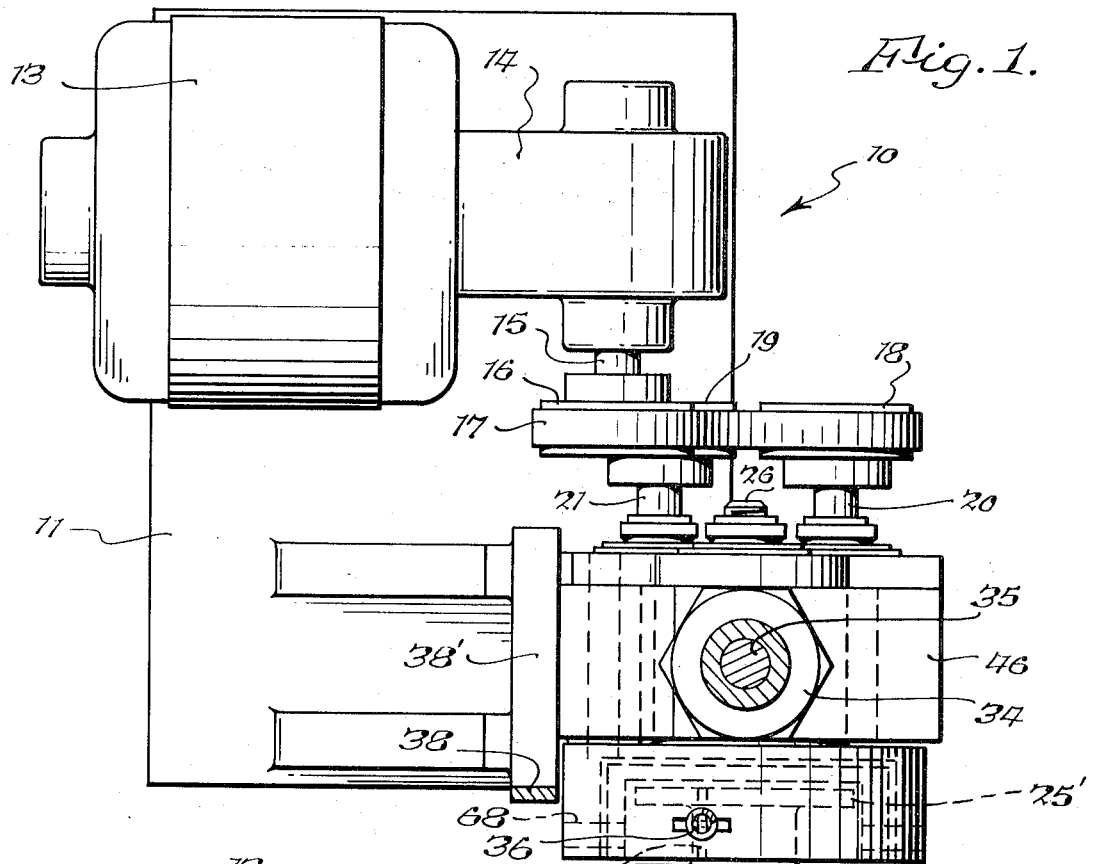
FIG. 1 is a fragmentary plan view partially in cross section of the improved machine tool of the present invention.
Figure 2:
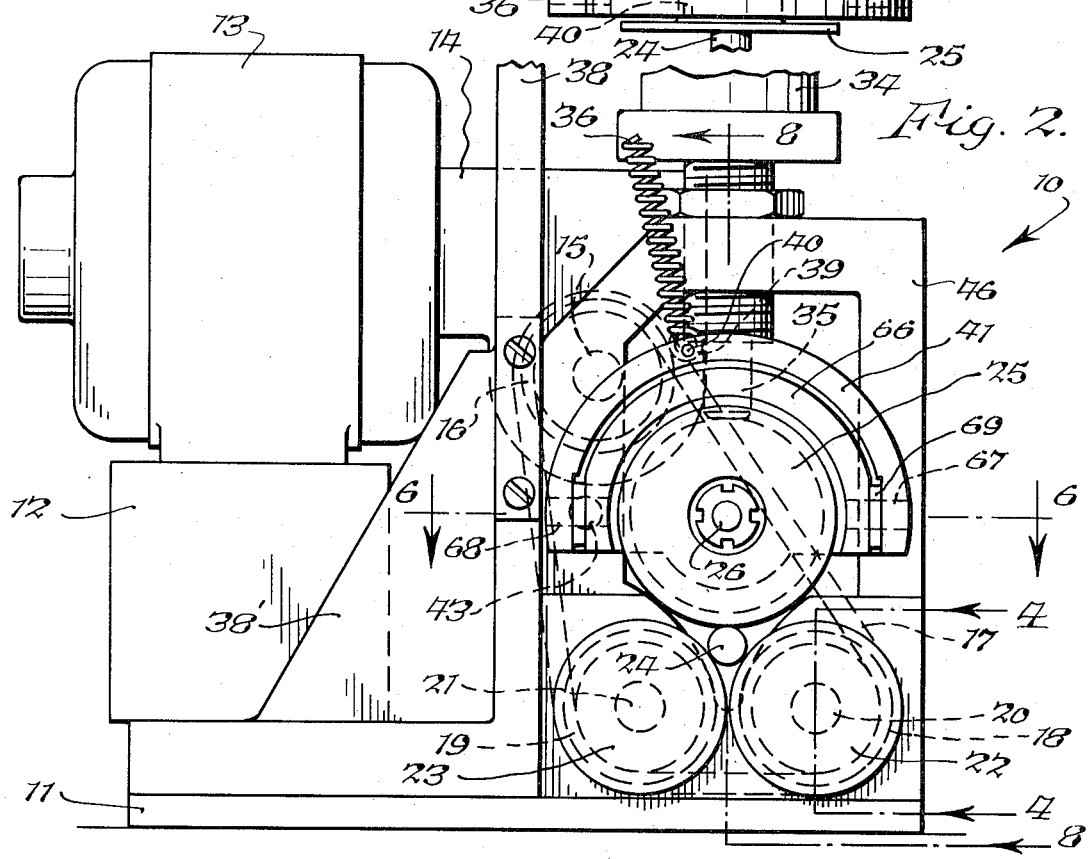
FIG. 2 is a fragmentary end elevational view of the machine tool of FIG. 1.

The improved machine tool 10 includes a base 11 mounting a pedestal 12 on which electric motor 13 is suitably supported. A gear reducer 14 extends from one end of motor 13 and in turn has an output shaft 15 on which pulley 16 is keyed. A belt 17 encircles pulley 16 and pulleys 18 and 19 which are keyed to the ends of shafts 20 and 21, respectively. The workpiece-supporting rollers 22-22' and 23-23' (FIGS. 2 and 8) are mounted at the ends of shafts 20 and 21, respectively, for supporting a workpiece 24 in conjunction with rollers 25-25' which are mounted on shaft 26, in a manner to be described more fully hereafter.

Rollers 22 and 22' are secured on spacer 27 which is mounted on shaft 20 which is journalled on block 28 by ball bearings 29 and 30. A collar 31 abuts one end of block 28 and a collar 32 abuts the other end of block 28 with the assembly of the collars 31-32 and the bearings 29-30 being held in operative position by a nut 33 which is threaded onto shaft 20. An identical supporting arrangement may be provided in association with supporting block 28', which is the mirror image of supporting block 28 and which journals shaft 21 therein which mounts rollers 23-23', mounted on spacer 24'. It can thus be seen that whenever motor 13 is running, rollers 22-22' and 23-23' will be caused to rotate because of the manner in which they are mounted on shafts 20 and 21, respectively, and the manner in which these shafts are coupled to motor 13, as described in detail above.

Figure 6:
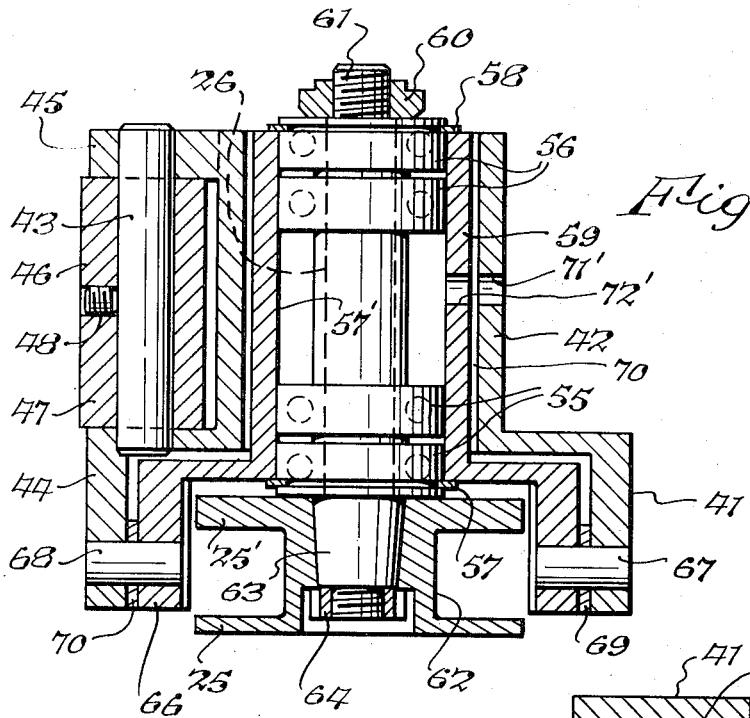
FIG. 6 is a cross sectional view taken substantially along line 6—6 of FIG. 2 and showing the manner in which one set of rollers which engage the workpiece are pivotally mounted relative to the base.

As noted briefly above, the workpiece 24 is rotated between the roller pairs 22-22', 23-23' and 25-25'. In order to insert workpiece 24 in the desired position shown in FIGS. 2 and 8, rolls 25-25' are moved radially away from rolls 22-22' and 23-23' by actuating the fluid pressure cylinder 34 so as to cause the piston rod 35 thereof to move upwardly in FIG. 3. This in turn will permit spring 36 to contact, spring 36 having its upper end 37 mounted on bracket 38 extending upwardly from standard 38' and its lower end 39 attached to pin 40 secured to arcuate yoke 41 which is formed as an extension of shaft housing 42 (FIG. 6). As can be seen from FIG. 8, piston rod 35 bears on housing 42 and when piston rod 35 is moved upwardly, spring 36 can contract, as noted above, to cause housing 42 to pivot in a counterclockwise direction in FIG. 2 about the axis of pin 43 which has its opposite ends mounted in ears 44 and 45 of the housing 42. The central portion of pin 43 is secured to leg 47 of inverted U-shaped yoke 46 by means of set screw 48 (FIG. 6), yoke 46 having its legs 47 and 47' extending upwardly from bearing blocks 28' and 28, respectively. Thus, after yoke 41 and housing 42 pivot away from the rolls 22-22' and 23-23', the workpiece 24 may be inserted axially between the rollers until such time as the end 49 of said workpiece engages the tip 50 of work stop 51 which is mounted on pin 52 (FIG. 8) and retained in position therein by set screw 53, pin 52 in turn being mounted in base 11 by set screw 54.

After the workpiece 24 has been positioned in the above described manner, the fluid cylinder 24 is energized to cause piston rod 35 to descend in FIG. 3 and cause housing 42 to pivot in a clockwise direction about the axis of pin 43 because of the above described connection between housing 42 and leg 47 of yoke 46. Housing 42 will pivot in the clockwise direction in FIG. 2 until such time as rollers 25-25' mounted at the end of shaft 26 firmly engage the workpiece to cause it to be securely clamped between the three pairs of rollers.

At this point it is to be noted that shaft 26 is mounted within housing 59 which is located within housing 42. In this respect pairs of bearings 55 and 56 are positioned in bore 57' of housing 59 and are retained therein by collars 57 and 58 at the opposite ends of housing 59 with the assembly being held in position by nut 60 threaded on the threaded end 61 of shaft 26. Collars 57 and 58 are in the form of split rings which are received in grooves, not numbered, in outer bearings 55 and 56, respectively. Collars 31 and 32 of FIG. 4 are analogous to collars 57 and 58. The spaced rollers 25-25' are formed as an integral unit with a central spacer portion 62 therein which is received on tapered end 63 of shaft 26 and is held in position thereon by nut 64. Rollers 22-22' and 23-23' are held on shafts 20 and 21, respectively, by nuts similar to nut 64.

Figure 8:
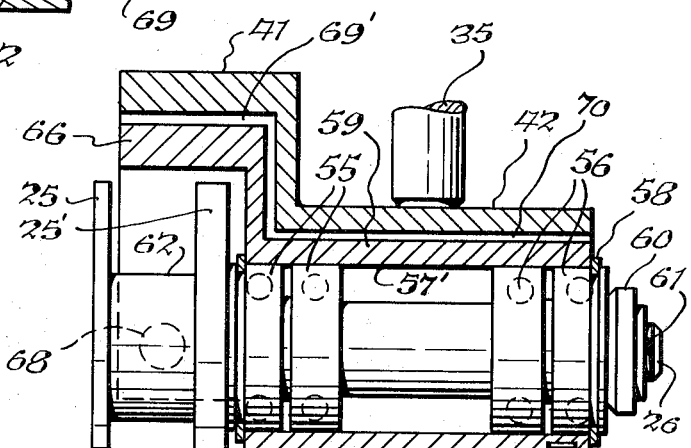
FIG. 8 is a fragmentary cross sectional view taken substantially along line 8—8 of FIG. 2 and showing the relationship between the stationary rollers, the pivotable rollers, and the remainder of the frame.
Figure 9:
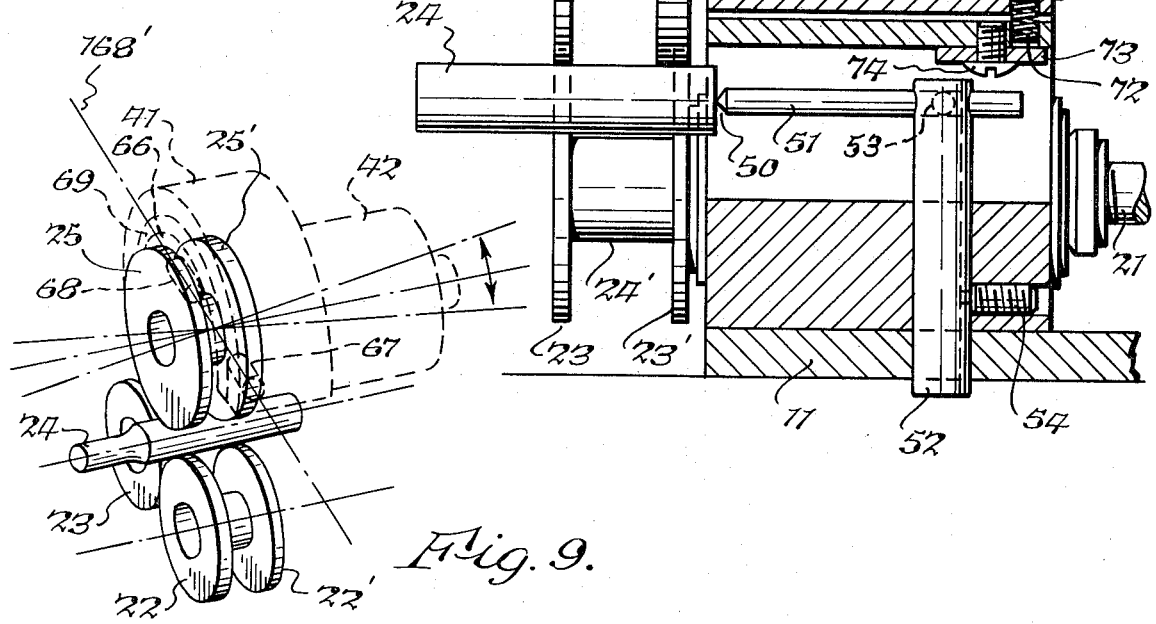
FIG. 9 is a perspective view showing the relationship between the various rollers and the workpiece supported therebetween and showing schematically the manner in which the pivotable rollers pivot to maintain optimum engagement with a workpiece.

Workpiece 24 is engaged at axially spaced locations by rollers 25 and 25' (FIG. 8). Rollers 25-25' are pivotally mounted within yoke 41 so as to cause them to maintain engagement with workpiece 24 at all times, irrespective of variations in diameter of the portions of workpiece 24 with which they are in contact. To this end inner yoke 66 (FIGS. 2 and 6) which is an extension of housing 59 is located in substantially concentric relationship to yoke 41 and is pivotally connected thereto by means of axially aligned pins 67 and 68 with washers 69 and 70 encircling pins 67 and 68, respectively, and being located between yokes 66 and 41. Thus, inner yoke 66 can pivot relative to outer yoke 41 because of the pinned connection 67-68 therebetween. Furthermore, it will be noted that the axes of pins 67 and 68 are aligned and they extend substantially centrally between rollers 25 and 25' (FIG. 6). Therefore if there should be any variation in diameter of workpiece 24 at the points at which rollers 25-25' engage it, the rollers 25-25' can pivot about the axes of pins 67-68 to maintain engagement with the workpiece. This pivotal action is permitted because there is a clearance 69' between yokes 66 and 41 and because there is a clearance 70 between housings 59 and 42. At this point it is to be noted that the axis of pin 43 (FIG. 6) extends substantially perpendicularly to the axis of pins 67 and 68. Therefore if cylinder 34 is pneumatic, rollers 25-25' can rock about the axis of pin 43 as well as about the axis of pins 68 and 69, so as a result, there will be an universal mounting of rollers 25-25'.

As can be seen from FIG. 8, since the major portion of the weight of the structure within housing 59 is to the right of pins 67-68, there will tend to be a clockwise rotation about pins 67-68. To compensate for this, a spring 72 is inserted between inner housing 59 and outer housing 42 and is held in position by tab 73 secured to housing 42 by screw 74. This spring merely compensates for the weight of inner housing 59 and tends to maintain it in the central concentric position with outer housing 42, as shown in FIG. 8.

Figure 7:
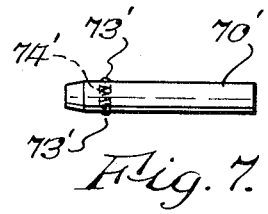
FIG. 7 is a side elevational view of a pin which may be used in the mounting of FIG. 6 for selectively eliminating the pivotal movement of the rollers.

A pin 70' (FIG. 7) can be inserted through aligned bores 71' and 72' (FIG. 6) in housings 42 and 59, respectively, to lock these housings against relative pivotal movement, if desired. Pin 70' is held in position by diametrically positioned ball detents 73' which are biased radially outwardly by spring 74'.

Figure 10:
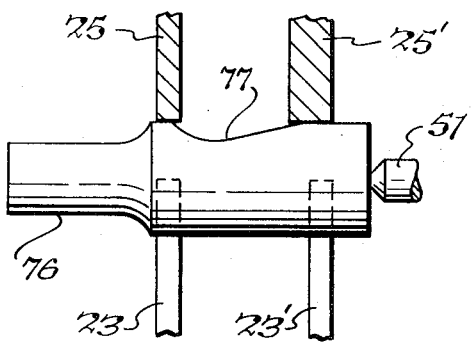
FIG. 10 is a fragmentary cross-sectional schematic view taken substantially along a vertical centerline of FIG. 11 and showing the manner in which a workpiece having narrow cylindrical portions straddling a depression is supported by the rollers which are in radial alignment with each other.

The above described spacing of rollers 25-25' is especially desirable for use with a workpiece 76 (FIG. 10) which may have a depressed portion 77 therein. With a workpiece of this type the spacing between rollers 25-25' permits the depressed portion 77 to be bridged conveniently so that a good grip is maintained on the workpiece 76, and further in the event the portions contacted by rollers 25-25' should vary in diameter, the above described pivotal action of the machine will permit the rollers to maintain good engaging contact with the workpiece. The limit of movement of workpiece 76 to the right will be determined by the work stop 51. At this point it is to be noted from FIG. 5 that the axis of rollers 25-25' is skewed relative to the axes of rollers 22-22' and 23-23'. This will cause the workpiece such as 76 or 24 to be biased to the right in FIGS. 10 and 8, respectively, when the rollers are rotating.

Figure 12:
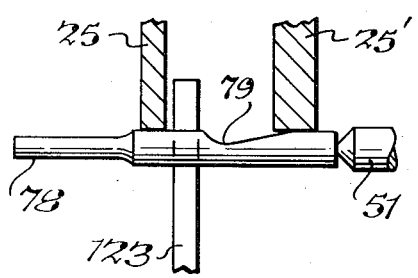
FIG. 12 is a fragmentary cross sectional view taken along a vertical centerline of FIG. 13 and showing the rollers in intermeshing relationship for supporting a workpiece having a depression therein.
Figure 13:
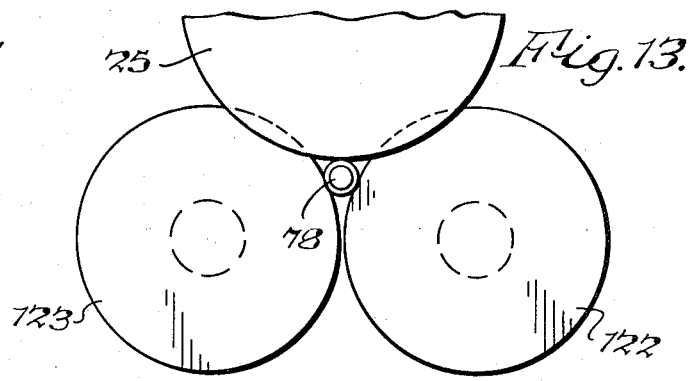
FIG. 13 is a fragmentary view taken from the left of FIG. 12.

In FIGS. 12 and 13 a modified form of the present invention is shown wherein the rollers 122 and 123, which are analogous to rollers 22 and 23, are of a diameter so that they intermesh with rollers 25-25'. In an orientation of this type, which is required for rotating an extremely small workpiece 78, there is still bridging of the cutaway portion 79 of the workpiece because of the spacing between roller 123 and roller 25'.

Figure 11:
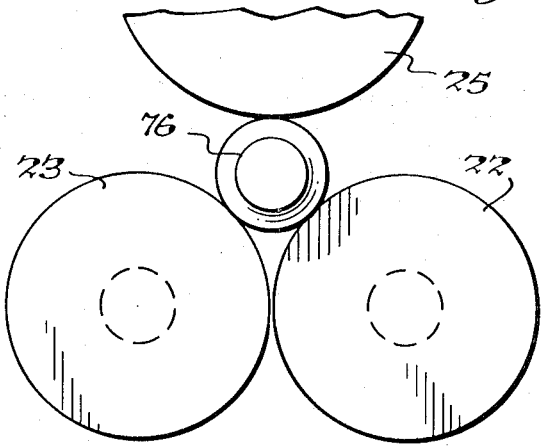
FIG. 11 is a fragmentary view taken from the left of FIG. 10.
Figure 14:
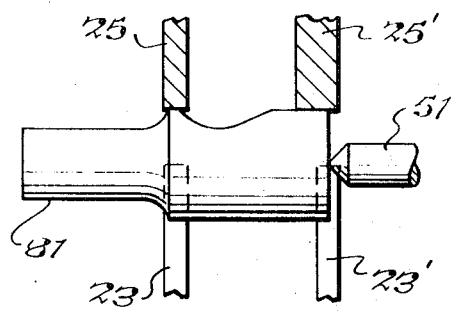
FIG. 14 is a fragmentary cross sectional view taken along a vertical centerline of FIG. 15 and showing a shortened workpiece having a depression therein supported by rollers which are in radial alignment with each other on spaced narrow cylindrical portions which are on opposite sides of the depression.
Figure 15:
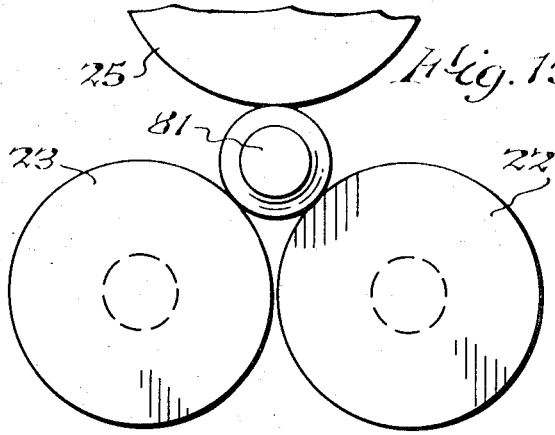
FIG. 15 is a fragmentary view taken from the left of FIG. 14.

In FIGS. 14 and 15 the same embodiment of the present invention, which is shown in FIGS. 10 and 11, is again shown except that the workpiece 81 is shorter than the workpiece 76, and it is illustrated in this figure how the workpiece may be supported in the same manner as shown in FIGS. 10 and 11 except that the end stop 51 has been moved to the left to engage the end of the workpiece. In this embodiment it can be seen how spaced narrow lands on the workpiece are engaged by the spaced rollers.

Figure 16:
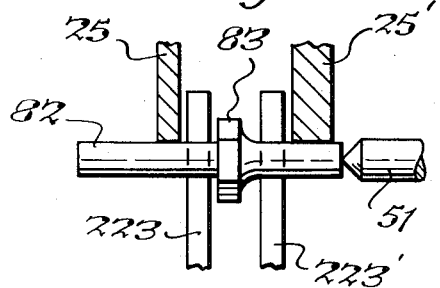
FIG. 16 is a fragmentary cross sectional view taken substantially along a vertical centerline of FIG. 17 and showing a workpiece having a protuberance thereon supported by rollers which are in intermeshing relationship.
Figure 17:
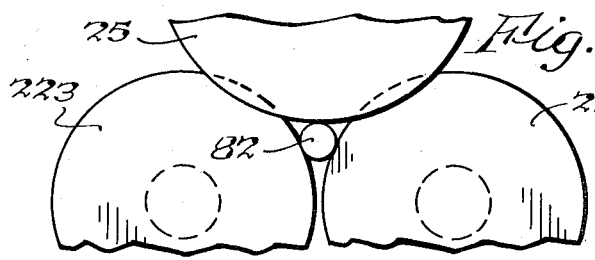
FIG. 17 is a view taken from the left of FIG. 16.

In FIGS. 16 and 17 a further modified form of the present invention is shown which is similar to FIGS. 12 and 13. In this embodiment there is an intermeshing relationship between rollers 25-25' on one hand and rollers 223-223' and 222-222' on the other hand to enable a relatively small diameter workpiece 82 to be held by the rollers. Furthermore, as can be seen from FIG. 16, workpiece 82 has an enlarged central protuberance 83 therein which is straddled by rollers 223 and 223' as well as by rollers 222 and 222' which are analogous to rollers 22 and 22', respectively.

In FIGS. 18 and 19 a still further embodiment of the present invention is shown wherein workpiece 84 having a depression 85 therein is held by spaced rollers 25-25' and rollers 322 and 323 which are in intermeshing engagement therewith and the end of the workpiece is engaged by end stop 51. This orientation of rollers is used for a small diameter workpiece having a short land area which is only slightly longer than the width of the three rollers 25, 323 and 25'.

In the embodiment of FIGS. 20 and 21 a workpiece 86 is shown which is of relatively small diameter and is supported by rollers 25-25' and by rollers 423 and 422. Workpiece 86 has an enlarged end 87 which is engaged by stop 51 which prevents it from moving toward the right. The land area of the workpiece which is engaged by the rollers is only slightly longer than the combined widths of rollers 25, 423 and 25'.

The embodiment of FIGS. 22 and 23 is generally similar to that described above relative to FIGS. 20-21, the only difference being in the manner in which workpiece 88 is inserted, namely, with the enlarged portion 89 being to the left, rather than to the right in FIG. 20, so that it can be acted on by a tool.

In FIGS. 24 and 25 there is a schematic representation of the manner in which a frustoconical workpiece 90 is supported. In this respect, rollers 25 and 25' can pivot about the axes 168' of pins 67 and 68 so as to engage the frustoconical surface of workpiece 90 while the workpiece is being supported between pairs of rollers analogous to 22-22', 23-23' and 25-25', without requiring any special set-up of machine 10. In this embodiment rollers 22a-22a' and 23a-23a' have rounded outer peripheral surfaces to maintain line contact with the workpiece.

It can thus be seen that the improved machine tool of the present invention is manifestly capable of achieving the above enumerated objects and while preferred embodiments of the present invention have been disclosed, it will readily be appreciated that it is not limited thereto but may be otherwise embodied within the scope of the following claims.

What is claimed is:

1. A machine tool for rotatably mounting a workpiece having spaced cylindrical portions comprising a base, first and second shafts mounted in spaced substantially parallel relationship on said base, first and second roller means mounted on said first and second shafts, respectively, for rotatably engaging said workpiece, a third shaft mounted on said base in generally parallel relationship to said first and second shafts, axially spaced third and fourth roller means mounted on said third shaft for rotatably engaging said workpiece, said first, second, third and fourth roller means being oriented relative to each other to receive said workpiece therebetween, and pivot means providing a pivot axis extending generally radially relative to said third and fourth roller means for permitting said third and fourth roller means to pivot toward and away from said first and second roller means whereby said third and fourth roller means will maintain engagement with spaced portions of said workpiece irrespective of slight differences in diameter of said spaced portions.

2. A machine tool as set forth in claim 1 wherein said pivot axis is located between said third and fourth roller means and extends in substantially perpendicular intersecting relationship to said third shaft.

3. A machine tool as set forth in claim 2 including means on said frame for causing said third shaft to approach and recede from said first and second shafts.

4. A machine tool as set forth in claim 3 wherein said means on said frame comprises second pivot means having an axis extending substantially parallel to the axes of said first and second shafts.

5. A machine tool as set forth in claim 3 wherein said first roller means comprises fifth and sixth roller means axially spaced on said first shaft, and wherein said second roller means comprises seventh and eighth roller means axially spaced on said second shaft.

6. A machine tool as set forth in claim 5 wherein said third, fifth and seventh roller means are in radial alignment with each other, and wherein said fourth, sixth and eighth roller means are in radial alignment with each other.

7. A machine tool as set forth in claim 5 wherein certain of said roller means on certain of said shafts are in intermeshing relationship with roller means on other of said shafts.

8. A machine tool as set forth in claim 4 including motor means on said base for driving said first and second shafts.

9. A machine tool as set forth in claim 8 wherein said first, second and third shafts are mounted on bearings on said base.

10. A machine tool for rotatably mounting a workpiece having spaced cylindrical portions comprising a base, first and second shaft means mounted in spaced substantially parallel relationship on said base, first and second roller means mounted on said first and second shaft means, respectively, for rotatably engaging a workpiece, third shaft means mounted on said base in generally parallel relationship to said first and second shaft means, axially spaced third and fourth roller means mounted on said third shaft means for rotatably engaging said workpiece, said first, second, third and fourth roller means being oriented relative to each other to engage said workpiece therebetween, and means mounting said third and fourth roller means for movement severally and simultaneously in a direction toward and away from said workpiece, whereby said third and fourth roller means will maintain engagement with spaced portions of said workpiece irrespective of slight differences in diameter of said spaced portions from the normal diameter of said workpiece.

* * * * *